United States Patent [19]

Dell et al.

[11] 4,281,994
[45] Aug. 4, 1981

[54] AIRCRAFT SIMULATOR DIGITAL AUDIO SYSTEM

[75] Inventors: Harold R. Dell, Menlo Park, Calif.; William L. Holtsman, Endwell, N.Y.; Michael V. Lamasney, San Jose, Calif.; Charles P. L. Mortimer, Binghamton, N.Y.

[73] Assignee: The Singer Company, Binghamton, N.Y.

[21] Appl. No.: 107,297

[22] Filed: Dec. 26, 1979

[51] Int. Cl.³ .................. G01C 21/00; H04M 1/00
[52] U.S. Cl. .................. 434/49; 179/1 SM; 364/578; 434/30; 434/321
[58] Field of Search .................. 35/10, 23, 12 Q; 179/1 SM, 1 SG, 1 VE; 364/801, 805, 200, 900, 578; 434/45–49, 30, 319, 321

[56] References Cited

U.S. PATENT DOCUMENTS

| | | | |
|---|---|---|---|
| 3,694,811 | 9/1972 | Wood | 179/1 SM |
| 3,870,818 | 3/1975 | Barton et al. | 179/1 SM |
| 3,982,070 | 9/1976 | Flanagan | 179/1 SM |
| 4,016,540 | 4/1977 | Hyatt | 179/1 SM |
| 4,060,848 | 11/1977 | Hyatt | 179/1 SM |
| 4,210,781 | 7/1980 | Nishimura et al. | 179/1 SM |

*Primary Examiner*—Errol A. Krass

*Attorney, Agent, or Firm*—Douglas M. Clarkson; J. Dennis Moore; Jeff Rothenberg

[57] ABSTRACT

A method and apparatus for providing mass storage of vocal information by means of a digital communication system for use with a training simulator is disclosed. Unlike prior art analog records and playback systems, such as tapes, etc., the inherent advantages and flexibility available with respect to a digital system including randomly accessible voice messages, convenience of editing the stored data, and management and control by the computational system of the training simulator are available with the present invention. In general, the system of this invention comprises an input device, such as a microphone (30), an encoder (54) for encoding the analog information from the microphone (32) to digital format, a digital processing controller or computer (20) for processing the digital communication data in response to a stored program such that it is suitable for use with the computational system, and a mass storage media (38) for storing the processed digital data. To provide audio response and playback from the stored digital data, the system includes a processor (36) for selectively reading stored bulk data and processing the selected data into a form suitable for decoding, a decoding means (66) for translating the digital data to analog information, and an output device (42) for providing an audio or vocal output to a listener.

8 Claims, 13 Drawing Figures

AIRCRAFT SIMULATOR DIGITAL AUDIO SYSTEM

DESCRIPTION

The Government has rights in this invention pursuant to Contract Number F33657-77-C-0565 awarded by the Department of the Air Force.

TECHNICAL FIELD

This invention relates to vehicular simulation and more particularly to a digital communication system which takes an audio or vocal input, processes it to a digital format, and stores the digital information in a form suitable for rapid retrieval and playback in an audio form.

BACKGROUND ART

Over a very short period of time, vehicular simulators and especially flight simulators have developed from the early bellows driven LINK trainers to today's highly sophisticated, computer controlled flight mission simulators. With ever increasing versatility and fidelity, todays simulators duplicate a broad spectrum of flight conditions and aircraft performance of both normal and malfunction modes. By employing advanced motion systems, a multitude of digital computers, visual displays and the like, present day simulators are able to generate and integrate a multiplicity of realistic flight cues used to provide effective training for flight crew members. However, as will be appreciated by those familiar with the art of teaching, it has been found that the more senses of an individual that can be directed toward a problem the faster and more thoroughly he learns. Vocal communications and instructions have, of course, always been a primary mode of teaching. Means of providing such vocal instruction, has, of course, in the past typically been from an instructor who is monitoring the performance of the student pilot and who then provides information, instruction, etc., to the student on how to handle a particular flight situation. In addition, vocal communications are also used extensively with certain types of ground control approaches and the like where a monitor or ground controller on the ground talks "the pilot down" in a low visibility situation. It is seen that in vehicular simulation training, vocal or audio communications are still of primary importance. In prior art vehicular simulators, attempts have been made to record audio information and have the audio information played back in response to particular actions, failures or errors on the part of the student pilot. However, such audio information has in the past been recorded by means of audio tapes and disks or other techniques commonly used in vocal and sound recording. As will be appreciated by those skilled in the art, such analog recording techniques suffer from the inability of rapid response and the inability to continuously repeat information if needed continuously. That is, the time required to advance a tape to a proper location for a particular message, or to rewind a tape for replaying the message may be so time consuming as to be completely unsatisfactory.

Therefore, it is a principal object of the present invention to provide methods and apparatus suitable for reproducing stored vocal or audio information in a form providing for rapid and continuous availability of the information. It will be appreciated, of course, by those skilled in the art that certain various areas of the communication industry such as the telephone communication industry are already using digital techniques for vocal communications. These techniques include digitizing the vocal input, transmitting (by microwave or other means) the digital information, and then once the transmitted information is received at the proper location reconverting the digital information to an audio or vocal sound to be received by a user. Detailed information related to digital vocal techniques can be found in the following publications: "Automatic Voice Response" by L. H. Rosenthal et al, *IEEE Spectrum* pp 61-68, July, 1974; "A Multiline Computer Voice Response System Utilizing ADPCM Coded Speech" by L. H. Rosenthal et al *IEEE Trans. Acoustics, Speech and Signal Processing*, pp 339-352, Vol. 22, October, 1974; "Digital Representations of Speech Signals" by R. W. Schafer et al, *Proceeding of the IEEE* pp 661-677 Vol. 63, April 1975. However, none of the prior art systems include means as does the present invention for storing and making the instructional information available in vocal format upon command of a flight profile program for purposes of training and response to a student pilot's flying performance.

Therefore, it is a further object of the present invention to provide a mass digital storage system for digital audio playback apparatus.

It is a further object of this invention to provide an effective and inexpensive means for providing prerecorded audio information to a training simulator student or operation/instructor.

It is yet another object of the present invention to provide an audio playback instruction system having low power consumption.

It is yet another object of the present invention to provide an audio playback instruction system in which the audio instructions can be selectively edited.

It is still a further object of the present invention to compose audio messages from digitally encoded words and phrases.

SUMMARY OF THE INVENTION

To accomplish the above-mentioned objects as well as other objects which will become evident from the following drawings and detailed description, the present invention provides apparatus for receiving audible vocal information, digitally storing such information, and playing back such information as vocal/audio information. This apparatus includes an input means such as microphone for receiving the audio information and for providing an input electrical analog signal representative of the audio information. The input electrical analog signal is received by an encoding means which converts it to an input digital signal which is representative of the input analog signal. This encoding may be accomplished by any suitable selected format, such as for example, delta modulation. The digital input signal is then stored in a Mass Storage medium. A computer or other control means is used to direct the digital data to the proper storage locations and to control the operation of the apparatus for retrieving the stored digital data when required. To play back stored digital data, there is also included a decoding means for receiving and reconverting the digital data to an output analog signal substantially similar to the original input electrical analog signal. The decoder, of course, reconverts according to the selected format. The output audio signal is then provided to a using output means such as a head set which in turn provides audible information to a listener.

BRIEF DESCRIPTION OF THE DRAWINGS

Accordingly, the above-mentioned objects and subsequent description will be more readily understood by reference to the following drawings wherein.

BEST MODE FOR CARRYING OUT THE INVENTION

Figure 1:
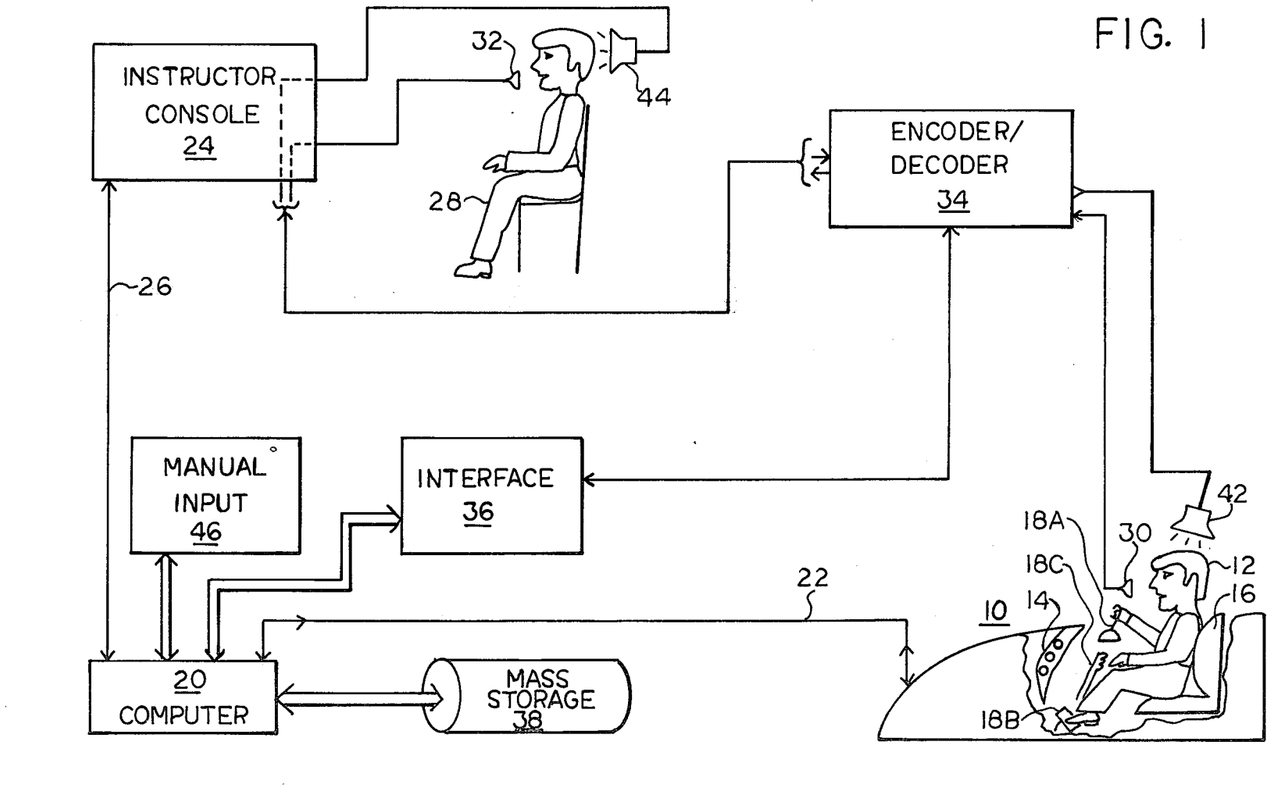
FIG. 1 is a partial pictorial and partial block diagram of a modern flight simulator complex using the digital vocal and audio apparatus of this invention to provide verbal information.

Referring now to FIG. 1 there is shown a modern aircraft simulator complex which incorporates the digital audio vocal communication system of the present invention. Simulator cockpit 10 with pilot trainee 12 sitting therein is typically manufactured to have the exact appearance of the aircraft being simulated and includes instruments 14, seat 16 and controls 18 (such as throttle 18A, pedals 18B for controlling the rudder, and control stick 18C for controlling the ailerons and elevators). Electrical signals representative of the movement of controls 18 by pilot trainee 12 are provided to computer 20 as is represented by line 22. Computer 20, then processes the received data in accordance with an aircraft profile program to provide movement to the motion system and indications to the cockpit instruments representative of the simulated aircrafts' flight performance. Computer 20 also receives inputs from the instructor station 24 represented by line 26. The inputs from the instructor station typically provide aircraft malfunction and flight condition information such as wind, turbulence, etc., to computer 20. In addition to the above-mentioned inputs, according to this invention, computer 20 may also receive analog vocal input signals from various sources including the student pilot 12, and the instructor 28 by means of microphone 30 and 32 respectively. It will also be appreciated, of course, that although a single aircraft cockpit 10 is illustrated in FIG. 1, many modern simulator complexes include two or more cockpits which ar controlled andd monitored by instructor station 24 and computer 20. This invention is, of course, suitable for use with such multiple cockpit complex.

Figure 2:
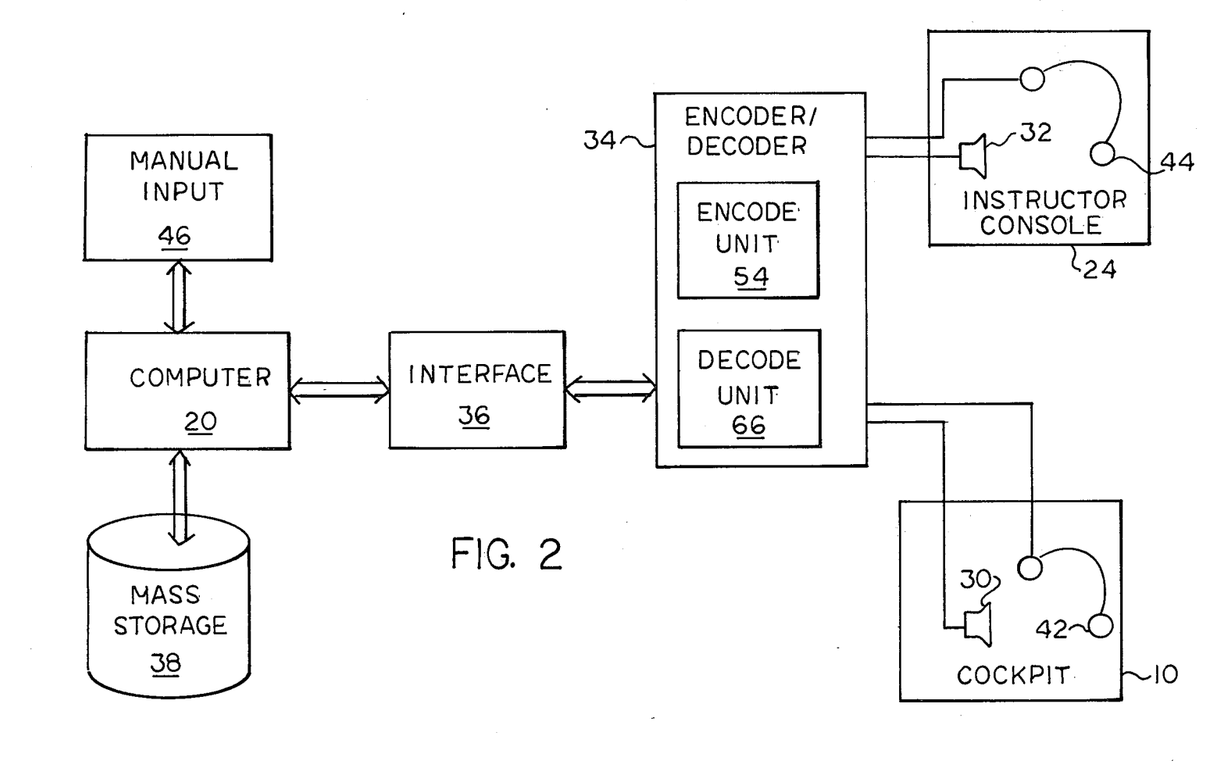
FIG. 2 is an overall electrical block diagram of the digital communication circuitry of this invention.

Referring now to FIG. 2, there is a block diagram showing only the digital storage and playback system of a vehicular simulator incorporating the features of this invention. It will be appreciated that elements common to FIGS. 1 and 2 as well as other figures use the same reference numbers. The input vocal or audio signals are provided to Encoder/Decoder 34 where they are converted from analog vocal signals into a digital format. The digital information is then processed in a manner to be discussed in detail hereinafter, by Interface circuitry 36 into a format suitable for storage and management by mass storage media 38 and computer 20 respectively. In a similar but reversed manner, desired instructions, statements or information previously recorded in digital format by mass storage unit 38 may be retrieved by computer 20, provided to interface circuitry 36, which then transforms the digital data to a suitable format for Encoder/Decoder 34 which in turn provides audio and vocal instruction or information contained in mass storage unit 38, or editing of the program which controls the instruction provided to student pilot 12 may also be accomplished at a manual input station 46.

Furthermore, due to the inherent flexibility of a digital system, this invention is also particularly suitable for message encryption or scrambling without any change in the hardware function, configuration, or performance. Other applications include using the vocal playback system as a computer controlled voice response device to provide verbal direction to crew member of feedback to the instructor, provide ground control approach instructions, landing commands, ground controlled intercepts, briefing messages, radio communications, VOR voice message, etc. Furthermore, logic and discrete phrases or words can be hung or joined together to provide intelligent communications and call patterns.

As will be appreciated by those skilled in the art, the instructions stored on mass storage unit 38 and controlled by Computer 20 may be made available to pilot trainee 12 with substantially no delay whatsoever. Such instructions can also, of course, be continuously repeated as desired without noticeable delay between such repetitions. Such immediate access and continuous repetition capability, is naturally superior to the time required for lookup and rewind on an analog magnetic tape type storage system. Thus, it will be appreciated that by proper programming and storage of the necessary messages, vocal instruction can be made to the student pilot in response to the pilot's own activities in the simulator. Furthermore, such verbal instructions can be accomplished with less interface and less monitoring on the part of the actual instructor. Therefore, it will be appreciated that great amounts of time and effort can be saved and more thorough training can be provided to a student with the system of this invention.

As will be appreciated by those skilled in the art, various types of general purpose computers have been found useful for use with vehicle simulators. The digital vocal storage and playback systems of this invention may be used with any such computer selected for use on the central or computational computer used with a vehicular simulator. The only additional requirements imposed on such a computer by the system of this invention is that adequate storage for the digital information representative of the vocal instruction to be reproduced must be available. It will be appreciated that mass storage unit 38 could be of any form including a disk, bubble memory, large scale core memory, semi-conductor means and the like. It will further be appreciated that standard input microphones (including noise cancelling types) and output headsets or speakers are suitable for use with the inventon and therefore require no additional discussion. In a similar manner, the interface circuitry 36 used to transform the digital information traveling between the computer and encoder/decoder 34 into a suitable format is also considered to be understood by one skilled in the art and will be discussed only in general terms.

Figure 3:
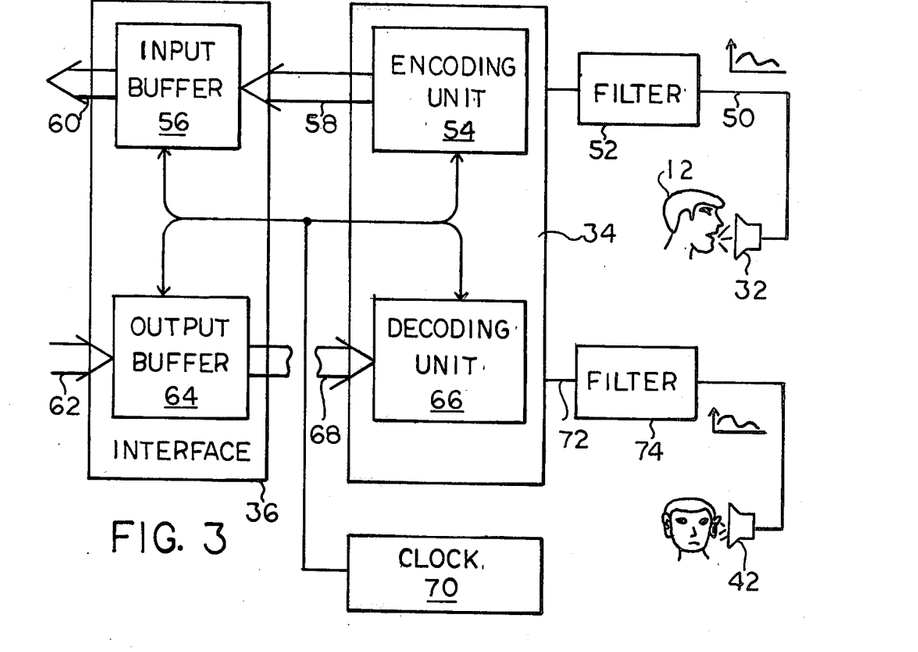
FIG. 3 shows a signal flow diagram of the digital communication system of this invention.

Referring now to FIG. 3 there is shown a signal flow diagram of the storage and playback vocal communication system suitable for use with the aircraft simulator digital vocal system of this invention. An analog input signal on line 50 is provided to filter 52 from any suitable device such as, for example, microphone 32. Filter 52 is simply to inhibit any frequencies which might be greater than upper frequency constraint of the system (related to Nyquist rate) and thereby eliminates any spurious response that otherwise might be generated. The output of lowpass filter 52 therefore provides a continuous analog signal with the high frequency content removed. This analog signal is then provided to encoding unit 54 of the encoder/decoder 34.

Encoding unit 54 performs a discrete quantizing of the analog signal to produce a discrete digital output. That is, encoding unit 54 converts the continuous analog signal from the microphone 32 into a discrete digital signal. Encoding unit 54 may, of course, use any suitable technique for making such transformation. Suitable techniques include pulse code modulation, differential pulse code modulation, adaptive differential pulse code modulation, delta modulation and adaptive delta modulation, etc. A particularly suitable and inexpensive technique and which will be described hereinafter is delta modulation. In any event, and regardless of which technique was used to convert the continuous analog signal to a digital discrete signal, the output of the Encoding unit 54 is then provided to Input Buffer 56 of the Interface circuitry 36. It will, of course, be appreciated that the digital output from Encoding unit 54 may, depending upon the technique used in transforming from analog to digital be in serial or parallel format as is indicated by the wide data arrow 58 flowing between encoding unit 54 and input buffer 56.

Input buffer 56 processes digital data received on line 58 to a form suitable for use and storage by computer 20 and mass storage unit 38. It will be appreciated, of course, that once the data is in the proper digital parallel format, it may then be stored, routed, altered, scrambled, edited or otherwise manipulated as could any other data in response to a suitable computer program. In addition, input buffer 56 also provides several layers of data buffering to accommodate the continuous stream of data from encoding unit 54 and to accommodate the assynchronous nature of the digital interface between this system and the computer 20. Parallel digital data suitable for manipulation by computer 20 is then transferred to computer 20 by means of parallel digital data lines 60.

In a reverse but similar manner, the data may then be retrieved from mass storage 38 by computer 20 and provided on parallel digital data lines 62 to output buffer 64. Output buffer 64 reconverts the data from the computer format into the format suitable for decoding unit 66 of encoder/decoder device 34. As was the case with respect to the input buffer 56, output buffer 64 also provides suitable buffering such that parallel or serial data from computer 20 may be provided, for example, as a continuous serial digital stream on line 68 to decoding unit 66. Input buffer 64 also, of course, provides synchronization for encoder/decoder and interface 36 according to the clock signals provided by clock control circuitry 70.

Decoding unit 66 of encoder/decoder device 34 performs an inverse transformation on the received parallel digital data which is equivalent but reverse of that performed by encoding unit 54 such that there is provided an output serial data stream similar to that received by encoding unit 54. That is, if the encoding unit 54 used delta modulation for its transformation from analog to digital format then decoding unit 66 will use inverse delta modulation technique. The wave shape of the output of decoding unit 66 is a discrete staircase type waveform on line 72 which is then applied to filter 74. Filter 74 is substantially a low pass filter designed to optimize the maximum signal to noise ratio of a signal on line 72. The output of filter 74 therefore is an analog signal which may be provided to any suitable device such as an audio amplifier driving a loud speaker or headset 42 or 44.

Although it will be appreciated that in any such system which transforms an analog signal to a digital signal and then back again to an analog signal, some of the original and distinctive signal characteristics are lost. It has been found, however, that by selection of a suitable sample rate such as 16 and 32 KHz per second, enough characteristics of the original vocal signal are retained such that a particular speaker can usually be identified. It will be appreciated that the more realistic the cues provided by an aircraft simulator, the more readily a student pilot accepts the training. Thus, it is important that any vocal instructions provide to the pilot trainee sound as natural as possible and not like a computer.

Figure 4:
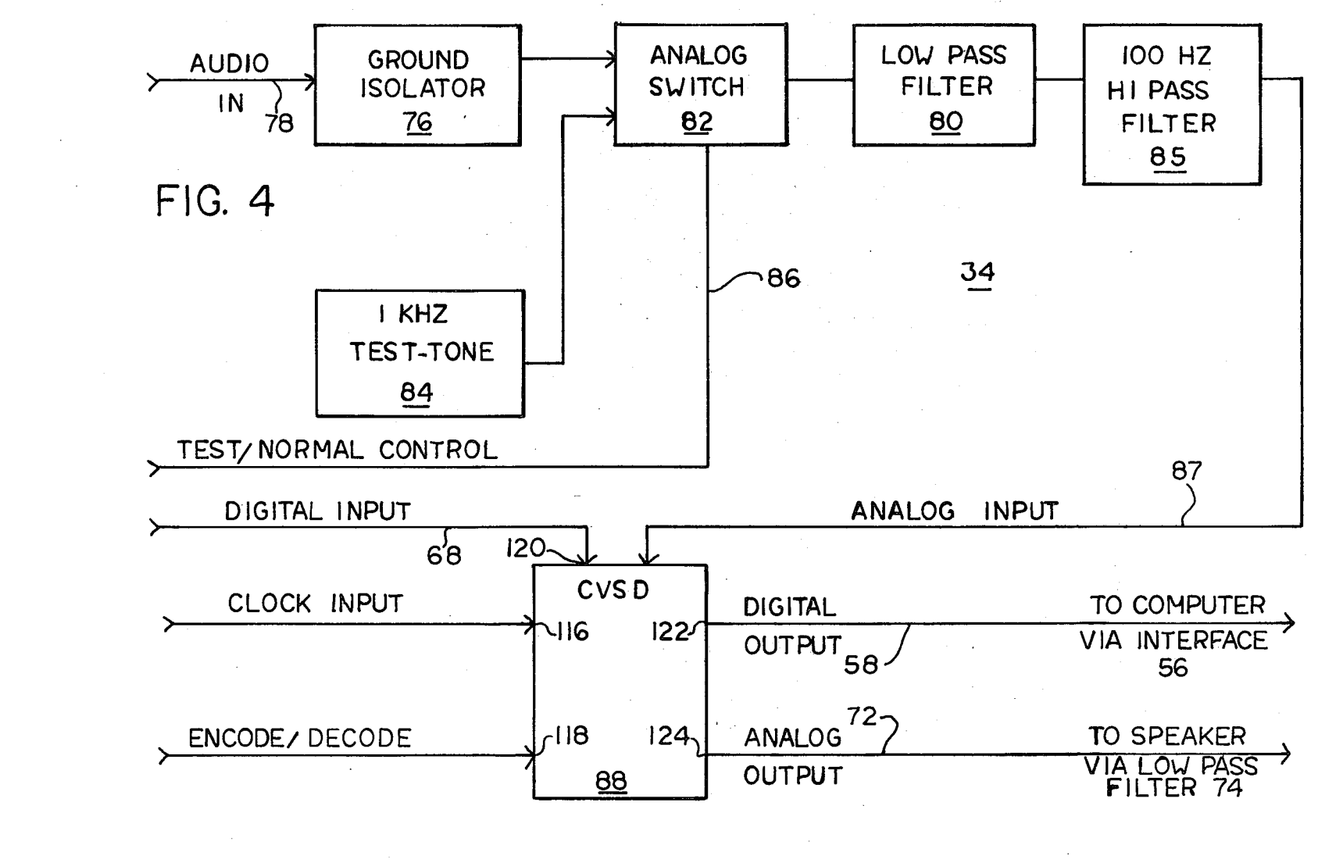
FIG. 4 shows a block diagram of the encode/decode circuitry of this invention.

As was discussed heretofore, it will be appreciated by those skilled in the art that various encoding and decoding devices and techniques may be used. However, it has been found that a delta modulator technique is especially inexpensive and useful for this invention. FIG. 4 shows a complete system using delta modulation that might be incorporated as the encoder/decoder device 34. As will be understood by those skilled in the art, some of the functions as described as being a portion of encoder/decoder 34 could be a preunit outside encoder/decoder 34.

Referring now to FIG. 4 there is shown a ground isolator 76 which may simply comprise a standard isolation amplifier. It will be appreciated that various level inputs could be used. The output of ground isolator 76 may then be applied to 5 KHz low pass filter 80 by means of an analog switch 82. It will, of course, be appreciated that analog switch 82 is not necessary for this invention but does provide an excellent location to introduce a test done such as a 1 KHz test tone by means of signal generator 84. Control signal 86 from computer 20 or from an external manual control test panel allows either the audio input from the ground isolator 76 or the test tone from test tone generator 84 to be selected for output to low pass filter 80. The output signal from lowpass filter 80 may also be passed through a high pass filter 85 such as a 100 Hz high pass filter to provide filtered input audio signal on line 87 to the basic encoding circuitry 88 of encoder/decoder 34.

Figure 5:
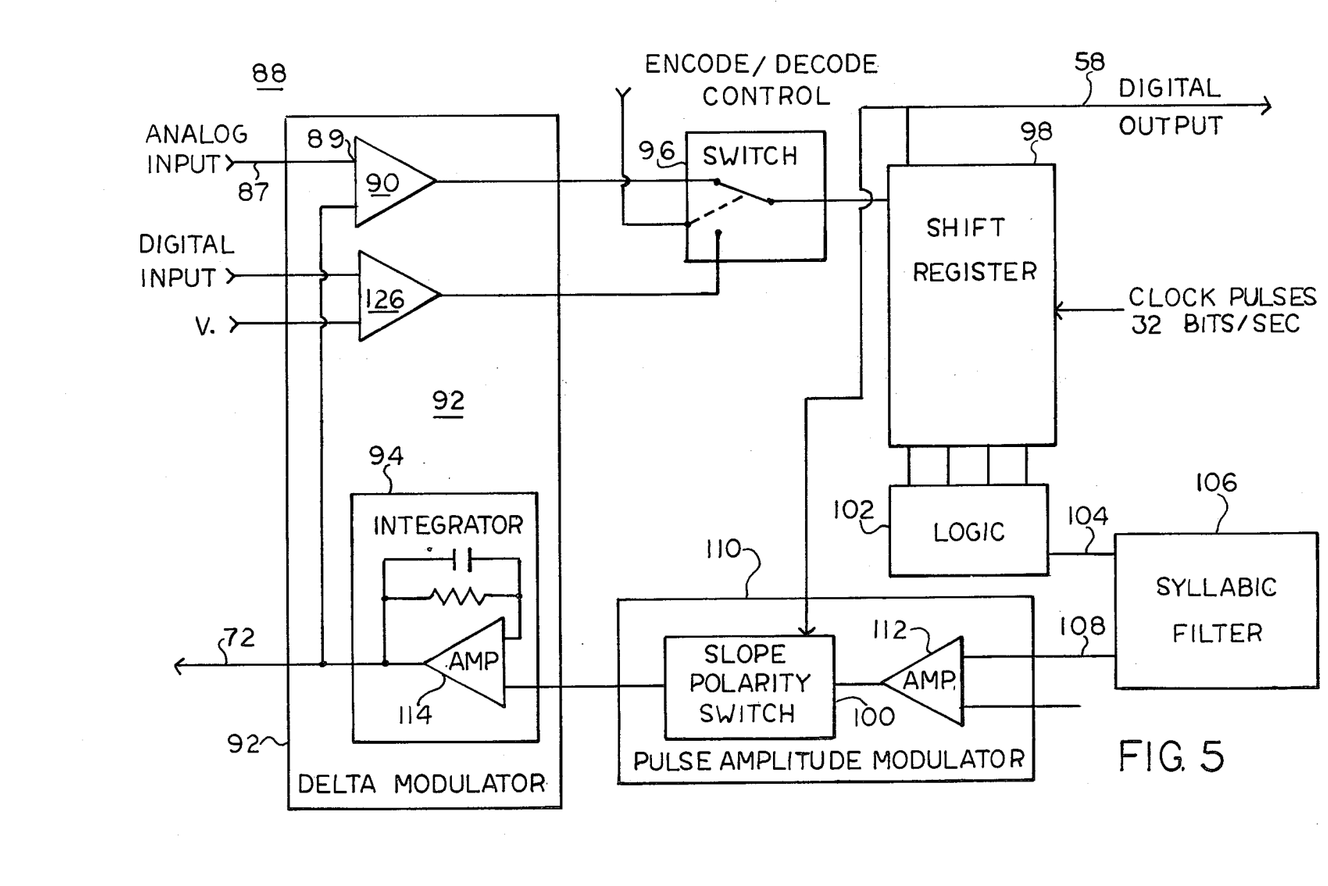
FIG. 5 shows a block diagram of the CVSD used with the circuitry of this invention.

It will be appreciated that although encoderdecoder 34 has been discussed with respect to a encoding unit 54 and a decoding unit 66, FIG. 3, in an actual application, many of the encoding/decoding components may be common. For example, the Continuously Variable Slope Modulator/Demodulator (CVSD) made by Motorola and having part no. MC3418 has been found to be especially useful for use with this invention. This CVSD may be used as both an encoder and decoder. In this respect, the encoder/decoder 34 of FIG. 4 includes circuitry similar to that provided by the Motorola circuit. FIG. 5 shows such a modulator/demodulator.

Referring now to FIG. 5, according to one embodiment, the high filter output signal from filter 85 on line 87 is applied to one of the inputs 89 of comparator 90 which comprises a part of delta modulator 92. The other input to comparator 90 is the substantially analog output of integrator 94 which is also part of delta modulator 92. The output of Comparator 90 of CVSD 88 is then passed through Switch 96 to shift register 98. Switch 96 is used to switch the input into shift register 98 between the analog input as heretofore discussed and a digital input for the decoding process to be discussed hereinafter.

During the encoding process the output of Comparator 90 is indicative of the sign of the difference between the input analog voltage and the output of Integrator 94. This output from comparator 90 is a digital output of encoder/decoder 34, and is also applied to a slope polarity switch 100. The purpose of the input to slope polarity switch 100 is to control the direction of the ramp signal to the integrator 94. Thus, as the sign of the difference between the input analog voltage and the integrator changes the slope of the ramp of integrator 94 also changes. Shift register 98 is typically a three bit or four bit shift register having storage locations which are continuously monitored by logic circuitry 102. Logic circuit 102 provides an output signal on line 104 whenever logic circuitry 102 determines that all four storage locations of shift register 98 are either all "ones" or "zero's".

Concidence output on line 104 from logic circuit 102 is then applied to lowpass filter 106. Filter 106 is a syllabic filter having an output 108 which is applied to pulse amplitude modulator 110. The syllabic filter 100 is an RC network for optimizing signal to noise ratio. Selection criteria are available from the manufacturer. Modulator 110 comprises the slope polarity switch 100 discussed heretofore and a converter amplifier 112. The other input to pulse amplitude modulator 110 is the digital output of sign bit stored in the first storage location of the shift register 98. The output of the pulse amplitude modulator 110 (from slope polarity switch 100) is the input to the amplifier 114 of the integrator 94 in delta modulator 92 and thus it will be appreciated that we have closed the loop on this circuitry.

Referring again to FIG. 4, there is shown the Continuous Variable Slope Delta Modulator 88 heretofore discussed. In addition to the analog input on line 87 to CVSD 98 there is also included a clock input at input point 116 and an encode/decode control signal at input 118 to control whether or not CVSD 88 is in an encode/decode mode. Also available, of course, is the digital input on line 68 into input 120. CVSD 88 also has two outputs, the first output being the digital output on line 58 at point 122 which provides digitized data to interface circuit 56. The other output of CVSD 88 is the analog output on line 72 from point 124 which provides the analog electrical signals which in turn drives the head sets or speakers.

Figure 6A:
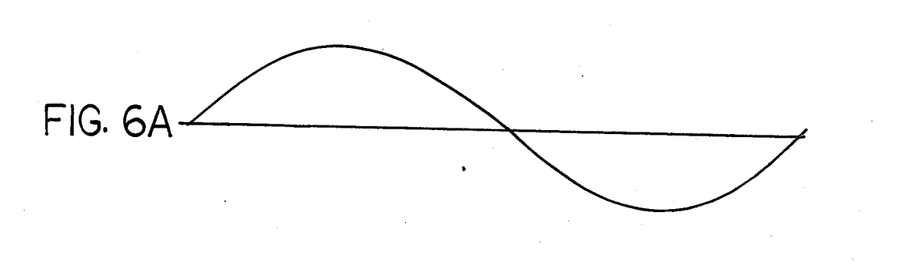
FIGS. 6A through 6D shows the wave shape of signals at various locations of the circuitry during the encode mode.

Thus, there has been described to this point the circuitry of a particular embodiment of the present invention. A more detailed description of the data flow and operation of the circuitry follows hereinafter, and may better be understood with attention to FIGS. 2, 3, 4, 5, 6, and 7. Assuming now that the circuitry has been checked out by the test tone from signal generator 84, etc., it is assumed that a spoken message is applied on line 78 to ground isolator 76 in FIG. 4. This signal passes through switch 82, low and high pass filters 80 and 85 respectively and is then applied by way of line 87 to CVSD 88. FIG. 6A shows a sample of a typical input analog vocal signal.

Figure 6B:
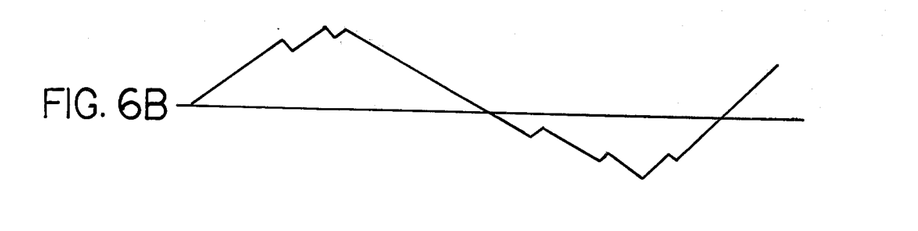
Figure 6C:
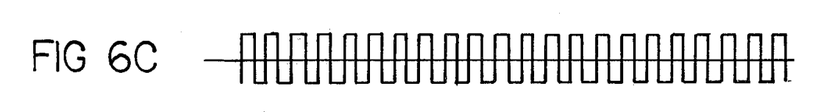
Figure 6D:
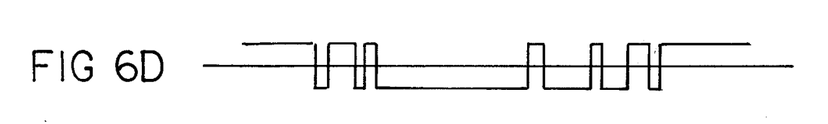

The analog signal of FIG. 6A is applied by line 87 in FIG. 5 to input 89 of comparator 90. The other input to comparator 90 is the reconstructed analog signal which provides the analog output of the CVSD 88. This reconstructed signal is represented by FIG. 6B. FIG. 6C shows a typical 32 KHz clockpulse which is applied to CVSD 88 at port 116. As is shown in FIG. 6B, the output of integrator 94 also includes certain high frequency and quantizing noise which as will be discussed hereinafter may be removed by low pass filter 74 (FIG. 3). The output of integrator 94 and the input analog signals on line 87 are compared in comparator 90 which provides high or low output digital signals which, as was discussed heretofore, reflect the sign of the difference between the input analog voltage and the integrator output voltage. FIG. 6D illustrates the output of comparator 90.

Thus, if an analog signal is being received by CVSD 88 it will be appreciated that switch 96 in FIG. 5 is in a position such that the output of Comparator 90 is provided to Shift Register 98. As was discussed heretofore shift register 98 has four locations, that is, it is a four bit register. The first location or bit of shift register 98 has an output which comprises the encoder/decoder digital output on line 58. The digital output on line 58 is then provided to interface circuitry 3 in FIG. 3 where it is stored and processed such that the serial digital bit stream on line 58 is converted to a parallel digital signal on line 60 suitable for storage and manipulation by the mass storage means 38 and the computer 20 respectively. Internally to CVSD 88, this digital output is also provided in FIG. 5 to the slope polarity switch 100 as will be discussed hereinafter. Logic circuitry 102 continuously reads the contents of the four storage locations of shift register 98 and provides an output on line 104 whenever all of the locations are the same. That is, each location is all "zero's" or all "ones".

The analog output signal from CVSD 88 which also serves as the system output signal and which is compared with the analog audio input signal by comparator 90 is generated as follows. The coincidence output on line 104 is provided to the syllabic filter 106 which in turn provides a gain control signal to the pulse amplitude modulator 110. Slope polarity switch 100 and converter 112 of pulse amplitude monitor 110 use the gain control signal and the digital output signal as was discissed heretofore to provide an input to integrator 94. The input to integrator 94 provides a reconstructed analog output signal from delta modulator 92 as was mentioned heretofore is the second input to comparator 90. Thus, there has been discussed to this point the technique for converting an analog input signal to a digital output signal.

When an instruction is desired to be played back, the computer 20 in FIG. 2 and mass storage means 38 will provide a parallel digital signal to output interface circuitry 36 which buffers the signals and converts such output parallel signals into a serial format identical to that shown in FIG. 6D. FIGS. 7A through 7D will be used to illustrate the conversion of such serial digital signals into a suitable analog signal. As was the case with the conversion of the analog signal to a digital signal the control clock pulses are shown as FIG. 7B.

Figure 7A:
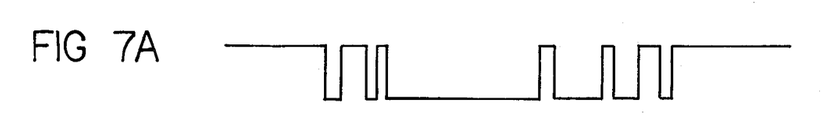
FIG. 7A through 7D shows the wave shape of signals at various locations of the circuitry during the decode mode.
Figure 7B:
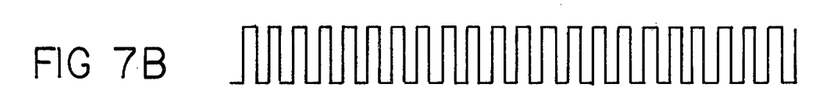

The digital output signal shown in FIG. 7A from output interface circuitry 64 is provided as a first input to comparator 126 in FIG. 5. The other input to comparator 126 is a threshold voltage level to assure that the output of comparator 126 is not responsive to noise or other spurious signals. In this mode of operation it will be appreciated that switch 96 is in a position such that the output of comparator 126 can be provided to shift register 98 rather than output of comparator 90 as was the case with respect to the converted analog input signal discussed heretofore.

Figure 7C:
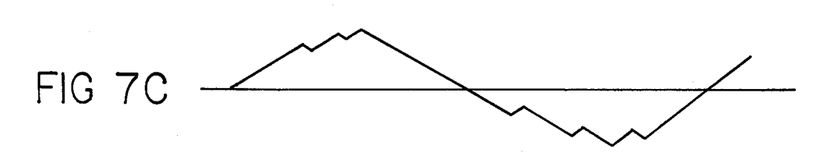
Figure 7D:
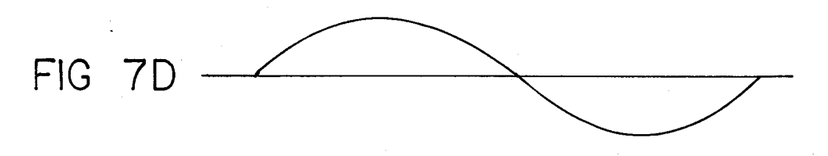

The operation of the CVSD 88 from this point on is identical to that discussed heretofore for generating a digital signal from the analog input vocal signal. Thus, it will be appreciated that a coincident output is provided from logic circuitry 102. FIG. 7C represents the reconstructed analog signal from integrator 94. It will be appreciated, of course, that the output of integrator 94 of delta modulator 92 not only provides a signal to analog comparator 89, but also provides the analog output. This analog output from integrator 94 may include quantitizing noise which may subsequently be further reduced or even eliminated by low pass filter 74. The output of low pass filter 74 as shown in FIG. 7D then represents the actual analog driving signal provided to the headset or speakers 30 and 32 of the simultor system.

Therefore, although the present invention has been described with respect to specific methods and apparatus and embodiments for an aircraft simulator to provide the analog-to-digital and digital-to-analog conversion of the digital vocal storage and playback system of this invention, it is not intended that such specific references and embodiments be considered limitations upon the scope of this invention except insofar as is set forth in the following claims.

I claim:

1. In a vehicle simulator for training an operator, having controls for manipulation by the operator and control means for providing cues back to the operator in response to said manipulation of said controls, apparatus for receiving a multitude of audible vocal instructions and information, digitally storing such instructions and information and playing back selected ones of said instructions and information in response to the manipulation of said controls by said operator, comprising:

a simulator cockpit having controls and instruments, means for providing electrical output signals representative of manipulation of said controls, and means for receiving electrical input signals for driving said instruments;

input means for receiving audio information and for providing input electrical analog signals representative of the said audio information;

encoding means for receiving said input electrical analog signals and converting said electrical analog signals into an input digital signal representative of said input audio information according to a preselected format;

storage means having a multiplicity of storage locations for storing said input digital signals; control means to operate in accordance with a predetermined flight profile program for providing said electrical input signals for driving said instruments, for controlling said apparatus, and for receiving and directing said input digital signals to selected ones of said multiplicity of storage locations to provide stored digital signals, said stored digital signals being the same as said input digital signals, and for retrieving said stored digital signals from selected ones of said storage locations;

decoding means for receiving and converting according to said preselected format, said retrieved stored digital signals into output analog electrical signals representative of said stored digital signals; and output means for receiving said output analog electrical signals and for providing audible vocal information substantially similar to said audio information received by said input means.

2. The apparatus of claim 1 and further including an instructors station suitable for providing inputs to said encoding means and suitable for receiving information from said decoding means.

3. The apparatus of claim 1 or 2 wherein said vehicle simulator is an aircraft simulator and said cockpit simulates an aircraft cockpit and said control means includes a computer with means to function in accordance with said flight profile program of said simulated aircraft.

4. The apparatus of claims 1 or 2 wherein said encoder and decoder include a delta modulator.

5. The apparatus of claim 4 wherein said delta modulator includes means for providing continuous variable slope modulation.

6. In a vehicle simulator for training an operator wherein controls of the vehicle being simulated are manipulated by the operator and cues are provided by instruments back to said operator in response to said manipulation of controls, a method for receiving a multitude of audible vocal instructions and information, digitally storing such instructions and information and playing back selected instructions and information in response to said manipulation of controls by said operator comprising the steps of:

providing electrical output signals representative of manipulation of controls in a simulator cockpit to a controller and receiving electrical input signals from said controller for driving said instrument;

receiving audio information and providing an input electrical analog signal representative of said received audio information;

encoding and converting said received input electrical analog signals into input digital signals representative of said input audio information according to a preselected format;

storing said input digital signals in a multiplicity of storage locations;

retrieving said stored digital signals from selected ones of said multiplicity of locations in accordance with a predetermined flight profile program;

receiving and decoding said stored digital signals into output analog electrical signals representative of said digital stored signals and according to said preselected format; and receiving said output analog electrical signals and providing audible vocal information substantially similar to said received audio information.

7. The method of claim 6 wherein said encoding and decoding steps are accomplished by delta modulation.

8. The method of claim 7 and further comprising the step of providing a continuous variable slope modulator for accomplishing said delta modulation.

* * * * *